US011085456B2

(12) United States Patent
Foster et al.

(10) Patent No.: US 11,085,456 B2
(45) Date of Patent: Aug. 10, 2021

(54) GAS-TURBINE ENGINE COMPOSITE COMPONENTS WITH INTEGRAL 3-D WOVEN OFF-AXIS REINFORCEMENT

(71) Applicant: United Technologies Corporation, Farmington, CT (US)

(72) Inventors: Larry Foster, South Glastonbury, CT (US); Rajiv A. Naik, Glastonbury, CT (US); John D. Riehl, Hebron, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 570 days.

(21) Appl. No.: 15/243,066

(22) Filed: Aug. 22, 2016

(65) Prior Publication Data

US 2018/0051705 A1    Feb. 22, 2018

(51) Int. Cl.
*F04D 29/02* (2006.01)
*F01D 25/24* (2006.01)
(Continued)

(52) U.S. Cl.
CPC ............ *F04D 29/023* (2013.01); *B29C 70/24* (2013.01); *F01D 5/282* (2013.01); *F01D 5/288* (2013.01);
(Continued)

(58) Field of Classification Search
CPC ...... F04D 29/023; F04D 29/38; F04D 29/522; F04D 29/542; B29C 70/24; B29C 70/222; F01D 25/24; F01D 5/147; F01D 9/162; F01D 5/282; F01D 5/288; F01D 9/041; F01D 25/162; B29L 2031/08; F05D 2220/32; F05D 2220/36; F05D 2230/50; F05D 2240/12; F05D 2240/14;
(Continued)

(56) References Cited

U.S. PATENT DOCUMENTS 5,270,094 A    12/1993  Anahara et al.
5,465,760 A    11/1995  Mohamed et al.
(Continued)

OTHER PUBLICATIONS

Bilisik; New Method of Weaving Multiaxis Three Dimensional Flat Woven Fabric: Feasibility of Prototype Tube Carrier Weaving; Fibres & Textiles in Eastern Europe 2009, vol. 17, No. 6 (77) pp. 63-69.

(Continued)

*Primary Examiner* — Courtney D Heinle
*Assistant Examiner* — Eric J Zamora Alvarez
(74) *Attorney, Agent, or Firm* — Cantor Colburn LLP

(57) ABSTRACT

A gas turbine engine and a composite apparatus is disclosed. The gas turbine engine includes a composite apparatus body formed from a composite material, the composite material including a three dimensional preform, the three dimensional preform including a plurality of warp fibers disposed in a warp direction in a first plane, a plurality of fill fibers disposed in a fill direction, wherein the fill direction is perpendicular to the warp direction in the first plane, a plurality of z-yarn fibers disposed in a z-yarn direction, wherein the z-yarn direction intersects the warp direction through the first plane, and a plurality of bias fibers disposed in a bias direction, wherein the bias direction is not aligned with the warp direction and the fill direction.

15 Claims, 3 Drawing Sheets

(51) Int. Cl.
- *F01D 5/28* (2006.01)
- *F01D 25/16* (2006.01)
- *F01D 9/04* (2006.01)
- *B29C 70/24* (2006.01)
- *F04D 29/38* (2006.01)
- *F04D 29/52* (2006.01)
- *F04D 29/54* (2006.01)
- *F01D 5/14* (2006.01)
- *B29L 31/08* (2006.01)

(52) U.S. Cl.
CPC ........... *F01D 9/041* (2013.01); *F01D 25/162* (2013.01); *F01D 25/24* (2013.01); *F04D 29/38* (2013.01); *F04D 29/522* (2013.01); *F04D 29/542* (2013.01); *B29L 2031/08* (2013.01); *F01D 5/147* (2013.01); *F05D 2220/32* (2013.01); *F05D 2220/36* (2013.01); *F05D 2230/50* (2013.01); *F05D 2240/12* (2013.01); *F05D 2240/14* (2013.01); *F05D 2240/30* (2013.01); *F05D 2300/6034* (2013.01)

(58) Field of Classification Search
CPC ......... F05D 2240/30; F05D 2300/6034; F05D 2300/603; Y10T 442/3195; D03D 25/005; D03D 41/004
See application file for complete search history.

(56) References Cited

U.S. PATENT DOCUMENTS

| | | | | |
|---|---|---|---|---|
| 5,490,602 | A * | 2/1996 | Wilson | B29C 70/22 216/56 |
| 5,672,417 | A * | 9/1997 | Champenois | F01D 5/282 416/230 |
| 6,431,837 | B1 * | 8/2002 | Velicki | F01D 5/282 416/223 R |
| 2012/0134839 | A1 * | 5/2012 | Parkin | F01D 5/147 416/230 |
| 2013/0243603 | A1 | 9/2013 | Naik | |
| 2014/0133989 | A1 | 5/2014 | Belmonte et al. | |

OTHER PUBLICATIONS

European Search Report for European Application No. 17185744.4 dated Jan. 29, 2018, 8 pages.

* cited by examiner

GAS-TURBINE ENGINE COMPOSITE COMPONENTS WITH INTEGRAL 3-D WOVEN OFF-AXIS REINFORCEMENT

BACKGROUND

The present disclosure relates to composite components for gas turbine engines, more particularly to composite components with 3-D woven off-axis reinforcement for gas turbine engines.

Composite components, such as fan blades, vanes, stators, etc., for gas turbine engines fabricated using 3-D weaving are being utilized to save weight and provide increased through-thickness stiffness, strength and interlaminar damage tolerance properties that are often very critical to the design of such complex engine structures. However, 3-D woven composite components that are fabricated on a conventional loom, with yarns that traverse only the longitudinal (warp) and transverse (weft) directions, have very low torsional strength and stiffness properties. Traditional 3-D woven components, thus, need to be reinforced separately with surface off-axis 2-D plies (or layers) to provide the torsional stiffness and strength properties needed for the design. Such secondary application of 2-D layers to provide the needed torsional properties adds additional cost and additional manual steps to the manufacturing process of these components. It also reduces the advantages afforded by the automated 3-D weaving process.

Accordingly, it is desirable to fabricate turbine engine components with automated 3-D woven fabrics that have the off-axis yarns integrated into the fabric during the weaving process itself.

BRIEF SUMMARY

According to an embodiment, a fan blade includes a fan blade body formed from a composite material, the composite material including a three dimensional preform, the three dimensional preform including, a plurality of warp fibers disposed in a warp direction in a first plane, a plurality of filling fibers disposed in a fill direction, wherein the fill direction is perpendicular to the warp direction in the first plane, a plurality of z-yarn fibers disposed in a z-yarn direction, wherein the z-yarn direction intersects the warp direction through the first plane, and a plurality of bias fibers disposed in a bias direction, wherein the bias direction is not aligned with the warp direction and the fill direction.

In addition to one or more of the features described above, or as an alternative, further embodiments could include that the bias direction is disposed in the first plane.

In addition to one or more of the features described above, or as an alternative, further embodiments could include that the fan blade body includes a root portion and an airfoil portion.

In addition to one or more of the features described above, or as an alternative, further embodiments could include that the root portion is thicker than the airfoil portion.

In addition to one or more of the features described above, or as an alternative, further embodiments could include that the fan blade body is formed from a plurality of composite layers.

According to an embodiment, a gas turbine engine includes a composite apparatus body formed from a composite material, the composite material including a three dimensional preform, the three dimensional preform including a plurality of warp fibers disposed in a warp direction in a first plane, a plurality of filling fibers disposed in a fill direction, wherein the fill direction is perpendicular to the warp direction in the first plane, a plurality of z-yarn fibers disposed in a z-yarn direction, wherein the z-yarn direction intersects the warp direction through the first plane, and a plurality of bias fibers disposed in a bias direction, wherein the bias direction is not aligned with the warp direction and the fill direction.

In addition to one or more of the features described above, or as an alternative, further embodiments could include that the bias direction is disposed in the first plane.

In addition to one or more of the features described above, or as an alternative, further embodiments could include that the composite apparatus body is formed from a plurality of composite layers.

In addition to one or more of the features described above, or as an alternative, further embodiments could include that the composite apparatus body is a fan blade body.

In addition to one or more of the features described above, or as an alternative, further embodiments could include that the fan blade body includes a root portion and an airfoil portion.

In addition to one or more of the features described above, or as an alternative, further embodiments could include that the root portion is thicker than the airfoil portion.

In addition to one or more of the features described above, or as an alternative, further embodiments could include that the composite apparatus body is a composite cover for a fan blade.

In addition to one or more of the features described above, or as an alternative, further embodiments could include that the composite cover includes a root portion and an airfoil portion.

In addition to one or more of the features described above, or as an alternative, further embodiments could include that the root portion is thicker than the airfoil portion.

In addition to one or more of the features described above, or as an alternative, further embodiments could include that the composite apparatus body is a fan case.

In addition to one or more of the features described above, or as an alternative, further embodiments could include that the composite apparatus body is a guide vane.

In addition to one or more of the features described above, or as an alternative, further embodiments could include that the composite apparatus body is a stator.

Other aspects, features, and techniques of the embodiments will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments provide composite components with three dimensional preforms including off-axis reinforcements.

Off-axis or biased reinforcement of the three dimensional preforms can provide increased torsional stiffness and strength to composite components.

Figure 1:
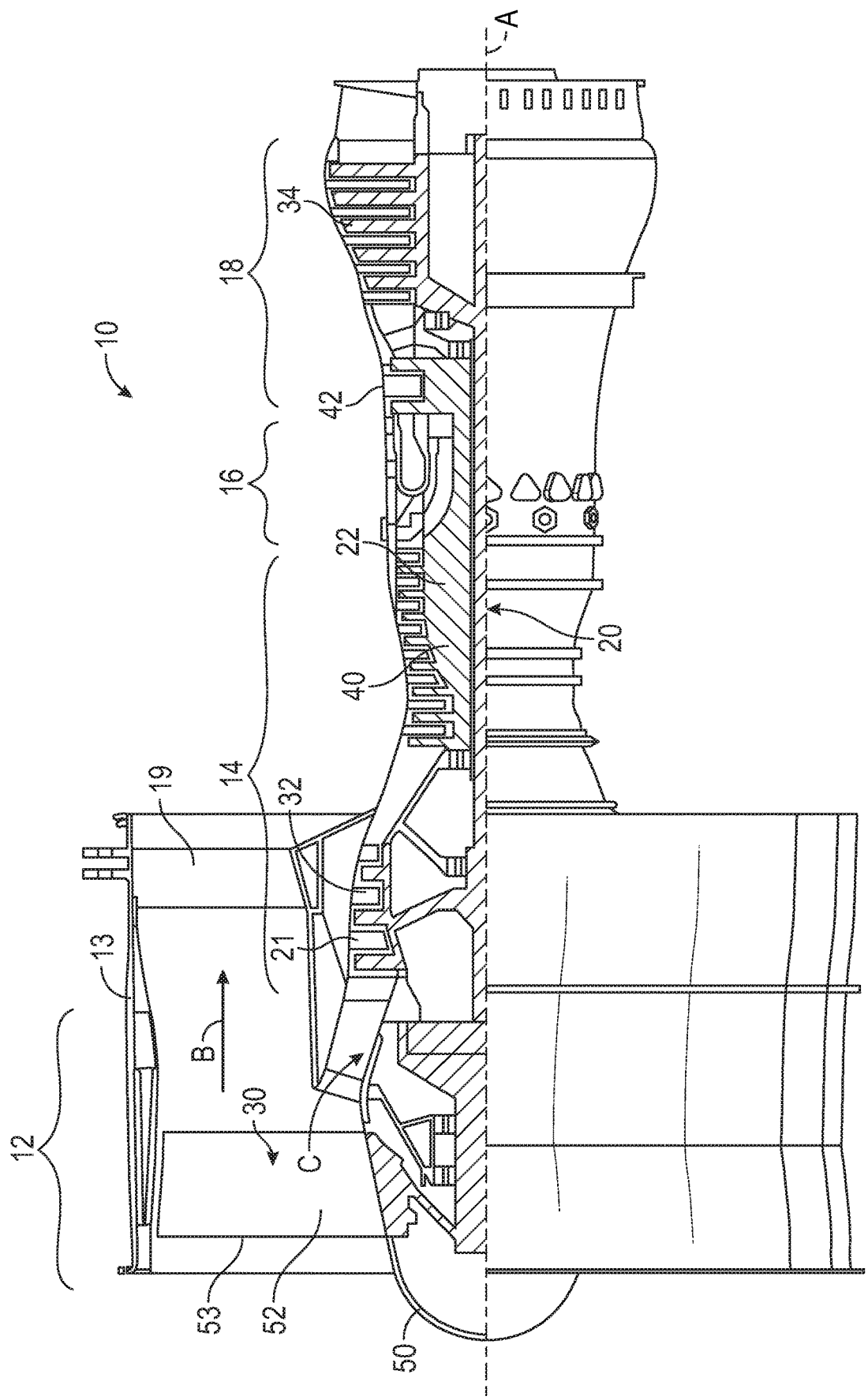
FIG. 1 is a schematic, partial cross-sectional view of a turbomachine in accordance with this disclosure.

Referring to FIG. 1 a schematic representation of a gas turbine engine 10 is shown. The gas turbine engine includes a fan section 12, a compressor section 14, a combustor section 16, and a turbine section 18 disposed about a longitudinal axis A. The fan section 12 drives air along a bypass flow path B that may bypass the compressor section 14, the combustor section 16, and the turbine section 18. The compressor section 14 draws air in along a core flow path C where air is compressed by the compressor section 14 and is provided to or communicated to the combustor section 16. The compressed air is heated by the combustor section 16 to generate a high pressure exhaust gas stream that expands through the turbine section 18. The turbine section 18 extracts energy from the high pressure exhaust gas stream to drive the fan section 12 and the compressor section 14.

The gas turbine engine 10 further includes a low-speed spool 20 and a high-speed spool 22 that are configured to rotate the fan section 12, the compressor section 14, and the turbine section 18 about the longitudinal axis A. The low-speed spool 20 may connect a fan 30 of the fan section 12 and a low-pressure compressor portion 32 of the compressor section 14 to a low-pressure turbine portion 34 of the turbine section 18. The high-speed spool 22 may connect a high pressure compressor portion 40 of the compressor section 14 and a high pressure turbine portion 42 of the turbine section 18. Guide vanes 19 and stators 21 can be utilized to direct flow within the turbine section 18.

The fan 30 includes a fan rotor or fan hub 50 that carries a fan blade 52. The fan 30 can include a fan case 13. The fan blade 52 radially extends from the fan hub 50. In certain embodiments, the fan blade 52 is partially or fully covered by a fan blade cover 53.

In certain embodiments, components of the gas turbine engine 10 can be formed from composite materials, including composite materials with three dimensional preforms as described herein. In certain embodiments, the three dimensional preforms can include an off-axis reinforcement such as bias yarns. Components that may be formed from composite materials include, but are not limited to, the fan case 13, the fan blade 52, the fan blade cover 53, the guide vanes 19, and the stator 21. Advantageously, components formed from 3-D woven fabrics with integral bias reinforcement can have a lighter weight and be more resistant to delamination failures while withstanding greater torsional forces.

Figure 2:
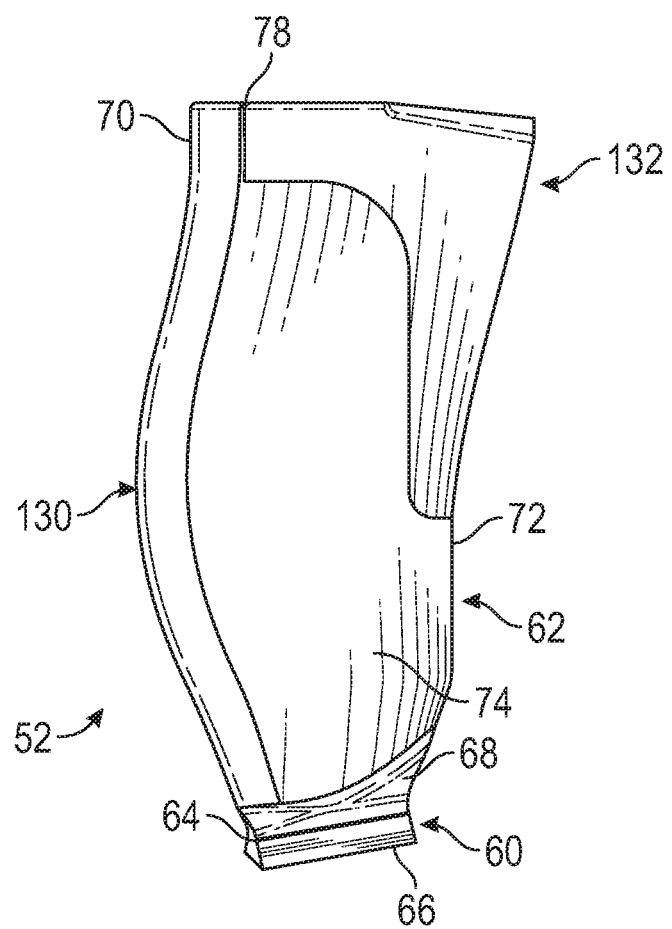
FIG. 2 is a schematic view of a fan blade for use with the turbomachine of FIG. 1.

Referring to FIG. 2, a fan blade 52 for use with the gas turbine engine 10 is shown. In the illustrated embodiment, the fan blade 52 is a lightweight composite fan blade that includes a root 60 and an airfoil 62 that extends from the root 60. In certain embodiments, the fan blade cover 53 can be formed of a similar construction as the fan blade 52.

The root 60 may be configured as a dovetail root, a fir tree root, or the like that operatively connects the fan blade 52 to the fan hub 50. The root 60 includes a neck 64, a base portion 66, and a transition portion 68. The neck 64 is a tapered portion of the root 60 that extends between the base portion 66 and the transition portion 68. The neck 64 has a thickness that is less than a thickness of the base portion 66. The neck 64 has a thickness that is greater than a thickness of the transition portion 68. The transition portion 68 provides a smooth transition from the root 60 to the airfoil 62.

The airfoil 62 radially extends from the root 60. In the illustrated embodiment, the root 60 is thicker than the airfoil 62. The airfoil 62 includes a leading edge 70, a trailing edge 72, a suction side 74, a pressure side 76, and a tip 78. The leading edge 70 is spaced apart from and disposed opposite the trailing edge 72. The suction side 74 and the pressure side 76 each axially extends between the leading edge 70 and the trailing edge 72. The suction side 74 and the pressure side 76 each radially extend from the root 60 to the tip 78. The suction side 74 and pressure side 76 each connect the leading edge 70 to the trailing edge 72.

The pressure side 76 is configured as a concave surface. The suction side 74 is disposed opposite the pressure side 76 and is configured as a convex surface. The tip 78 is spaced apart from the root 60. The tip 78 extends between distal ends of the leading edge 70 and the trailing edge 72. The tip 78 extends between distal ends of the pressure side 74 and the suction side 76.

In the illustrated embodiment, the fan blade 52 can be formed from a composite material. In certain embodiments, portions of the fan blade 52 can be formed from composite materials, while in other embodiments, the entire body of the fan blade 52 is formed from composite materials. In certain embodiments, the fan blade 52 can be formed from multiple composite layers formed together.

Figure 3:
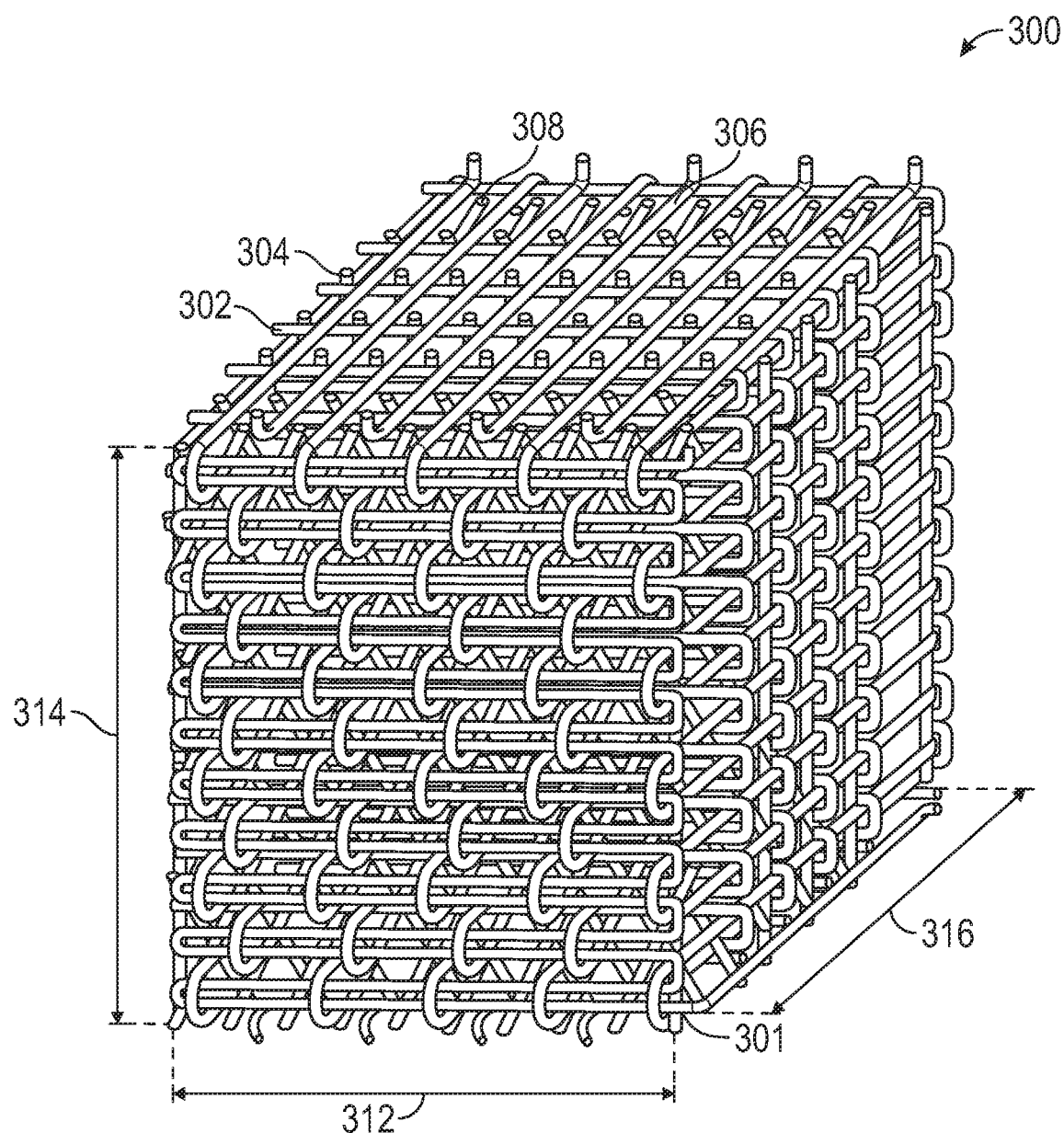
FIG. 3 is a schematic view of a three-dimensional preform for use with composite components such as the fan blade of FIG. 2.

Referring to FIG. 3, a three-dimensional preform 300 for use with a composite material is shown. In the illustrated embodiment, the three-dimensional preform 300 includes filling yarn or fiber 302, warp yarn or fiber 304, z-yarn or fiber 306, and bias yarn or fiber 308. In the illustrated embodiment, the three-dimensional preform 300 can be used with a composite material to form composite components for use in a gas turbine engine, such as the gas turbine engine 10 shown in FIG. 1. The three-dimensional preform 300 can be utilized in composite materials to form components including, but not limited to the fan case 13, the fan blade 52, the fan blade cover 53, the guide vanes 19, and the stator 21 as shown in FIG. 1. In certain embodiments, the three-dimensional preform 300 can be utilized in other applications including armor and automotive applications. Advantageously, the use of the three-dimensional preform 300 within a composite material allows for lighter, thinner, and more efficient components while allowing for desired strength, stiffness and damage tolerance.

In the illustrated embodiment, the three-dimensional preform 300 can be any suitable fabric style or pattern or fiber and matrix combination. In certain embodiments, the three-dimensional preform 300 is formed or woven from carbon fiber or glass fiber, or aramid fiber, or silicon carbide fiber or any combination of these fibers in order to achieve desired properties in different regions of the composite structure. Further, three-dimensional preform 300 can be utilized with epoxy or any other suitable matrix such as but not limited to bismaleimide, polyimide, thermoplastic, etc., to form the composite components as described herein. In certain embodiments, the three-dimensional preform 300 can be formed on a loom, while in other embodiments, the three-dimensional preform 300 can be formed using any suitable apparatus or method.

In the illustrated embodiment, the three-dimensional preform 300 includes filling yarn 302 disposed in a fill direction 312. In the illustrated embodiment, three-dimensional preform 300 includes warp yarn 304 disposed in a warp direction 314. In the illustrated embodiment, the warp direction 314 is perpendicular to the fill direction 312. In the illustrated embodiment, the fill direction 312 and the warp direction 314 form a plane 301. In certain embodiments, each plane 301 can define a layer of filling yarn 302 and warp yarn 304. Multiple planes 301 can be stacked along the z-yarn direction 316 to form the three-dimensional preform 300.

In the illustrated embodiment, z-yarn 306 is disposed in a z-yarn direction 316. In the illustrated embodiment, the z-yarn direction 316 is disposed through each of the planes 301 defined by the fill direction 312 and the warp direction 314. In certain embodiments, the z-yarn direction 316 is perpendicular or at an angle to the warp direction 314. In the illustrated embodiment, the z-yarn 306 can allow for additional interlaminar strength between each of the layers of filling yarn 302 and warp yarn 304.

In the illustrated embodiment, the three-dimensional preform 300 includes bias yarns 308. In the illustrated embodiment, the bias yarns 308 can provide off-axis reinforcement of the three-dimensional preform 300. The bias yarns 308 are disposed to not be aligned with the fill direction 312 and the warp direction 314. In certain embodiments, the bias yarns 318 can be disposed within the plane 301 defined by the fill direction 312 and the warp direction 314, yet not aligned with the fill direction 312 and the warp direction 314. In other embodiments, the bias yarns 318 can be disposed in planes defined by any combination of the fill direction 312, and the warp direction 314.

In the illustrated embodiment, during the forming process the bias yarns 308 can be manipulated to be disposed in an off-axis direction. Advantageously, the use of bias yarns 308 allows for off-axis reinforcement. In the illustrated embodiment, the three-dimensional preform 300 can be utilized in fan blades, such as fan blade 52 shown in FIGS. 1 and 2. In fan blades 52 the use of bias yarns 308 can provide adequate torsional stiffness and strength. Further, the three-dimensional preform 300 can be constructed to provide different composite material properties in various regions of the fan blade, such as the camber portion, an airfoil portion, and the root portion of the fan blade. In certain embodiments, the three-dimensional preform 300 can be formed to allow a root portion of a fan blade to be thicker than the airfoil portion of the fan blade.

Generally, the use of bias yarns 308 in the three-dimensional preform 300 can allow for lighter, thinner and more efficient components while meeting required strength and stiffness requirements. For example, for components for use within gas turbine engines, components can be designed to withstand bird strikes and still be tuned to avoid certain operating frequencies. The fiber type, size or filament count, spacing or ends and picks per unit length and orientation of the yarns 302, 304, 306, and 308 within the three-dimensional preforms 300 can allow for tailored properties of the composite material and apparatus. Additionally, integrally weaving the bias yarns with the filling, warp and z-yarns provides an automated process to fabricate composite components with the desired interlaminar strength and torsional properties all in one manufacturing step.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A fan blade comprising:
a fan blade body formed from a composite material, the composite material including a three dimensional preform, the three dimensional preform consisting of:
  a plurality of warp fibers disposed in a warp direction in a first plane;
  a plurality of filling fibers disposed in a fill direction, wherein the fill direction is perpendicular to the warp direction in the first plane;
  a plurality of z-yarn fibers disposed in a z-yarn direction, wherein the z-yarn direction intersects the warp direction through the first plane; and
  a plurality of bias fibers disposed in a bias direction, wherein the bias direction is not aligned with the warp direction and the fill direction and the bias direction is disposed in the first plane.

2. The fan blade of claim 1, wherein the fan blade body includes a root portion and an airfoil portion.

3. The fan blade of claim 2, wherein the root portion is thicker than the airfoil portion.

4. The fan blade of claim 1, wherein the fan blade body is formed from a plurality of composite layers.

5. A gas turbine engine comprising:
a composite apparatus body formed from a composite material, the composite material including a three dimensional preform, the three dimensional preform consisting of:
  a plurality of warp fibers disposed in a warp direction in a first plane;
  a plurality of filling fibers disposed in a fill direction, wherein the fill direction is perpendicular to the warp direction in the first plane;
  a plurality of z-yarn fibers disposed in a z-yarn direction, wherein the z-yarn direction intersects the warp direction through the first plane; and
  a plurality of bias fibers disposed in a bias direction, wherein the bias direction is not aligned with the warp direction and the fill direction and the bias direction is disposed in the first plane.

6. The gas turbine engine of claim 5, wherein the composite apparatus body is formed from a plurality of composite layers.

7. The gas turbine engine of claim 5, wherein the composite apparatus body is a fan blade body.

8. The gas turbine engine of claim 7, wherein the fan blade body includes a root portion and an airfoil portion.

9. The gas turbine engine of claim 7, wherein the root portion is thicker than the airfoil portion.

10. The gas turbine engine of claim 5, wherein the composite apparatus body is a composite cover for a fan blade.

11. The gas turbine engine of claim 10, wherein the composite cover includes a root portion and an airfoil portion.

12. The gas turbine engine of claim 11, wherein the root portion is thicker than the airfoil portion.

13. The gas turbine engine of claim 5, wherein the composite apparatus body is a fan case.

14. The gas turbine engine of claim 5, wherein the composite apparatus body is a guide vane.

15. The gas turbine engine of claim 5, wherein the composite apparatus body is a stator.

* * * * *